United States Patent [19]

Ito

[11] Patent Number: 5,210,415
[45] Date of Patent: May 11, 1993

[54] METHOD AND APPARATUS FOR FORMING ENERGY SUBTRACTION IMAGES

[75] Inventor: Wataru Ito, Kanagawa, Japan

[73] Assignee: Fuji Photo Film Co., Ltd., Kanagawa, Japan

[21] Appl. No.: 680,181

[22] Filed: Apr. 3, 1991

[30] Foreign Application Priority Data

Apr. 4, 1990 [JP] Japan .................................. 2-89367

[51] Int. Cl.$^5$ ............................................ G01N 23/04
[52] U.S. Cl. .................................. 250/327.2; 378/62; 378/156; 358/111
[58] Field of Search .......................... 250/327.2, 484.1; 378/51, 62, 99, 156; 358/111; 364/413.23

[56] References Cited

U.S. PATENT DOCUMENTS

| | | | |
|---|---|---|---|
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |
| 4,482,918 | 11/1984 | Keyes et al. | 358/111 |
| 4,590,517 | 5/1986 | Kato et al. | 364/413.23 |
| 4,602,156 | 7/1986 | Asai et al. | 250/327.2 |
| 4,710,875 | 12/1987 | Nakajima et al. | 364/414 |
| 4,816,681 | 3/1989 | Shimura | 250/327.2 |
| 4,855,598 | 8/1989 | Ohgoda et al. | 364/413.23 |
| 4,868,857 | 9/1989 | Dobbins, III | 378/99 |
| 4,896,037 | 1/1990 | Shimura et al. | 250/327.2 |

FOREIGN PATENT DOCUMENTS

56-11395 2/1981 Japan .
61-5193 2/1986 Japan .

*Primary Examiner*—Carolyn E. Fields
*Assistant Examiner*—Drew A. Dunn
*Attorney, Agent, or Firm*—Sughrue, Mion, Zinn, Macpeak & Seas

[57] ABSTRACT

Radiation images of an object are recorded by irradiating several kinds of radiation with different energy levels to an object constituted of tissues exhibiting different levels of radiation absorptivity with respect to the several kinds of radiation with different energy levels. Image signals representing the radiation images are then detected. An image signal is selected from the image signals, or an image signal representing the mean-level image of the radiation images is generated from the image signals. Values of parameters for a subtraction process are changed in accordance with the values of the image signal, which has been selected from the image signals, or the image signal, which represents the mean-level image of the radiation images. The image signal components of the image signals are subtracted from each other, which image signal components represent corresponding picture elements in the radiation images, with the value of each parameter being thus changed for different picture elements in each of the radiation images. A subtraction image signal is thereby obtained which represents a subtraction image, in which only the pattern of a specific tissue of the object is formed or emphasized.

14 Claims, 4 Drawing Sheets

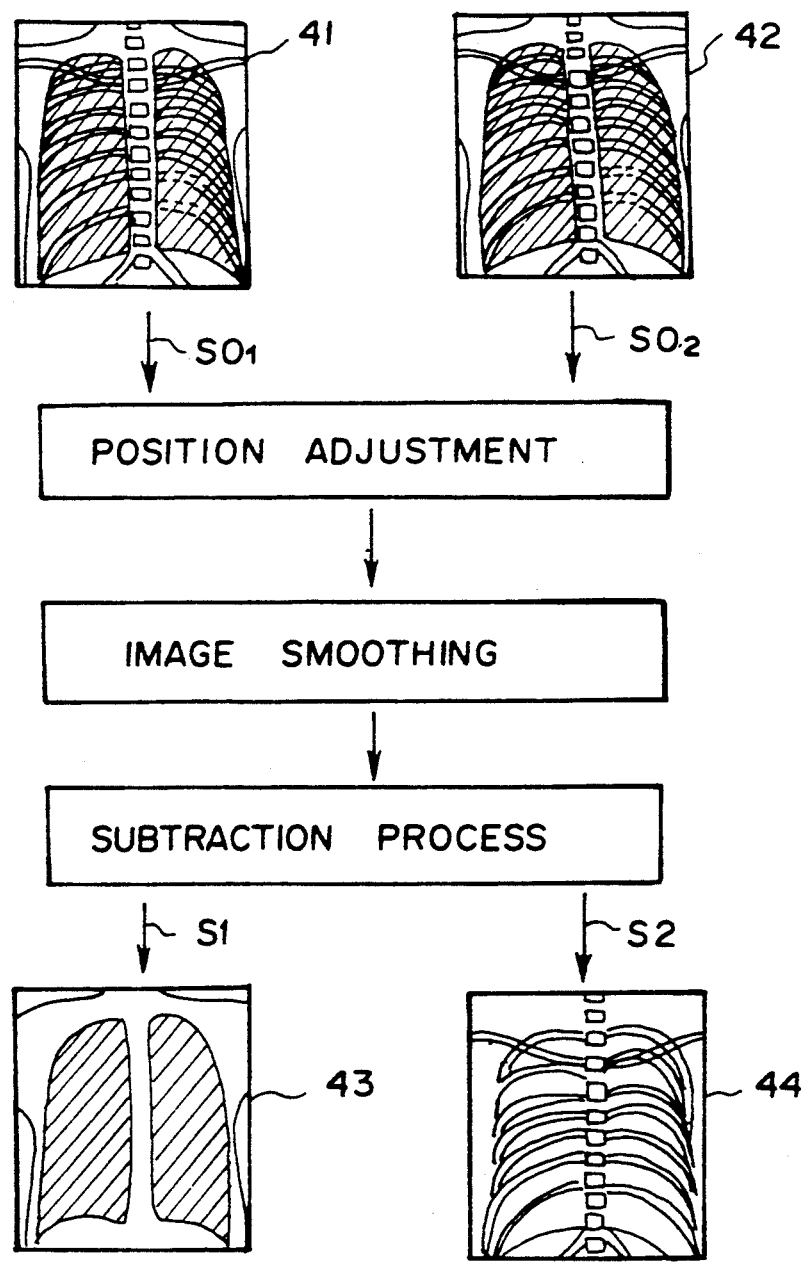

METHOD AND APPARATUS FOR FORMING ENERGY SUBTRACTION IMAGES

BACKGROUND OF THE INVENTION

1. Field of the Invention

This invention relates to a method for forming an energy subtraction image by accurately carrying out energy subtraction processing on all of image signal components of image signals representing images. This invention also relates to an apparatus for carrying out the method.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets are used, subtraction processing techniques for radiation images are often carried out on image signals detected from a plurality of radiation images of an object which have been recorded o the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

In the aforesaid energy subtraction processing, when an object is exposed to radiation having a predetermined energy distribution in the course of recording radiation images of the object, different parts of the object exhibit different levels of radiation transmittance.

Also, the object exhibits a lower level of radiation transmittance with respect to the low energy components of the radiation than the high energy components thereof. Therefore, as the radiation passes through the object, the energy distribution of the radiation shifts to the high energy side as a whole. Such a phenomenon is referred to as the "beam hardening." The extent of the shift of the energy distribution varies for different parts of the object.

As described above, in the aforesaid energy subtraction processing, such characteristics are utilized that a tissue of an object exhibits different levels of radiation transmittance with respect to radiation with different energy levels. From the energy subtraction processing, a subtraction image is obtained in which only the patterns of desired tissues of the object have been extracted or emphasized. Therefore, if the beam hardening phenomenon occurs to different extents for different parts of the object, the problems will occur in that patterns of unnecessary tissues are erased completely and only the patterns of desired tissues are embedded in a certain region of the subtraction image, whereas patterns of unnecessary tissues are not erased completely in a different region of the subtraction image. As a result, a subtraction image having good image quality cannot be obtained.

SUMMARY OF THE INVENTION

The primary object of the present invention is to provide a method for forming an energy subtraction image wherein, when the beam hardening phenomenon occurs to different extents for different parts of an object, the adverse effects of the beam hardening phenomenon are minimized, and a subtraction image having good image quality is thereby obtained.

Another object of the present invention is to provide an apparatus for carrying out the method for forming an energy subtraction image.

The present invention provides a method for forming an energy subtraction image, which comprises the steps of:

i) after a plurality of radiation images of an object are recorded on recording media by irradiating several kinds of radiation with different energy levels to said object, which is constituted of a plurality of tissues exhibiting different levels of radiation absorptivity with respect to the several kinds of radiation with different energy levels, and a plurality of image signals representing the plurality of said radiation images are then detected, each of the plurality of said image signals being made up of a series of image signal components, selecting an image signal from the plurality of said image signals, or generating an image signal, which represents the mean-level image of the plurality of said radiation images, from the plurality of said image signals, ii) changing the values of parameters, which are used for a subtraction process, in accordance with the values of said image signal, which has been selected from the plurality of said image signals, or in accordance with the values of said image signal, which represents the mean-level image of the plurality of said radiation images, and iii) subtracting the image signal components of the plurality of said image signals from each other, which image signal components represent corresponding picture elements in the plurality of said radiation images, with the value of each said parameter being thus changed for different picture elements in each of the plurality of said radiation images, whereby a subtraction image signal is obtained which represents a subtraction image, in which only the pattern of a specific tissue of said object is formed or emphasized.

The present invention also provides an apparatus for forming an energy subtraction image, which comprises:

i) a parameter storage means for storing information about functions representing the values of parameters to be used for a subtraction process, in which functions the level of an image signal selected from a plurality of image signals representing a plurality of radiation images of an object or the level of an image signal, which is generated from the plurality of said image signals and represents the mean-level image of the plurality of said radiation images, serves as a variable, the plurality of said radiation images of said object having been recorded on recording media by irradiating several kinds of radiation with different energy levels to said object, which is constituted of a plurality of tissues exhibiting different levels of radiation absorptivity with respect to the several kinds of radiation with different energy levels, each of the plurality of said image signals being made up of a series of image signal components, and ii) a subtracting operation means for subtracting the image signal components of the plurality of said image signals from each other, which image signal components represent corresponding picture elements in the plurality of said radiation images, with the values of said parameters, which have been calculated for the respective picture elements from said functions stored in said parameter storage means, and thereby obtaining a subtraction image signal representing a subtraction image, in which only the pattern of a specific tissue of said object is formed or emphasized.

With the method and apparatus for forming an energy subtraction image in accordance with the present invention, an image signal is selected from the plurality of the image signals representing the plurality of radiation images subjected to the subtraction process. Alternatively, an image signal, which represents the mean-level image of the plurality of the radiation images, is generated from the plurality of the image signals. The values of the parameters, which are used for the subtraction process, are changed in accordance with the values of the image signal, which has been selected from the plurality of the image signals, or in accordance with the values of the image signal, which represents the mean-level image of the plurality of the radiation images. The image signal components of the plurality of the image signals are then subtracted from each other, which image signal components represent corresponding picture elements in the plurality of the radiation images, with the value of each parameter being thus changed for different picture elements in each of the plurality of the radiation images. Therefore, even if the beam hardening phenomenon occurs to different extents for different parts of an object, the adverse effects of the beam hardening phenomenon can be minimized, and a subtraction image having good image quality can be thereby obtained.

The extent of the beam hardening phenomenon is determined by the total radiation transmittance in the direction of the thickness of the object between the front surface of the object, upon which the radiation impinges, and the rear surface of the object, from which the radiation emanates. Therefore, the difference in the extent of the beam hardening phenomenon at different parts of the object has a correlation with the image density in a radiation image (i.e. the value of the image signal representing the radiation image). Accordingly, in the method and apparatus for forming an energy subtraction image in accordance with the present invention, in the course of carrying out the subtraction process on the image signal components of a plurality of image signals, which image signal components represent corresponding picture elements in the plurality of the radiation images, the value of each of the parameters for the subtraction process is changed for different parts of each radiation image in accordance with the value of the image signal representing the radiation image.

The values of the parameters, which are used for the subtraction process, may be changed in accordance with the values of an image signal, which has been selected from the plurality of the image signals representing the plurality of the radiation images subjected to the subtraction process. Alternatively, the values of the parameters may be changed in accordance with the values of an image signal, which is generated from the plurality of the image signals and represents the mean-level image of the plurality of the radiation images subjected to the subtraction process. The mean-level image of the plurality of the radiation images includes less noise components than the plurality of the radiation images. Therefore, in cases where the values of the parameters are changed in accordance with the values of the image signal representing the mean-level image of the plurality of the radiation images, adverse effects of the noise components upon the subtraction process can be minimized.

Ordinarily, how to change the values of the parameters in accordance with the values of an image signal may be determined experimentally. Experiments carried out by the inventor revealed that, in cases where radiation images of objects, e.g. the chests of adults, are recorded with the image recording system being kept under the same recording conditions, e.g. with the same energy distribution of the radiation, even if the objects vary in their physical constitutions, subtraction images having good image quality can be obtained with the same functions representing the parameters wherein the level of the image signal serves as a variable. The subtraction images thus obtained are free of adverse effects from the difference in the extent of the beam hardening phenomenon at different parts of each object. In cases where the radiation images of markedly different objects, e.g. the chests of adults and children, or the chests and the abdomens, the functions representing the parameters should preferably be determined for each type of object.

In order for the adverse effects of the noise components to be eliminated more positively, before the method for forming an energy subtraction image in accordance with the present invention is carried out, an image signal should preferably be generated which represents an image, wherein only the low frequency components of a radiation image have been illustrated or emphasized. The values of the parameters may then be changed in accordance with the values of the image signal thus generated. In such cases, how small fluctuations are to be at least taken into consideration may be determined in accordance with the extent of noise included in an image, the accuracy with which a subtraction process is to be carried out, or the like.

BRIEF DESCRIPTION OF THE DRAWINGS

FIG. 3 is a flow chart showing the processes, which are carried out in the image processing and displaying apparatus.

DESCRIPTION OF THE PREFERRED
EMBODIMENTS

The present invention will hereinbelow be described in further detail with reference to the accompanying drawings. In the embodiments described below, X-ray images are stored on stimulable phosphor sheets.

Figure 1:
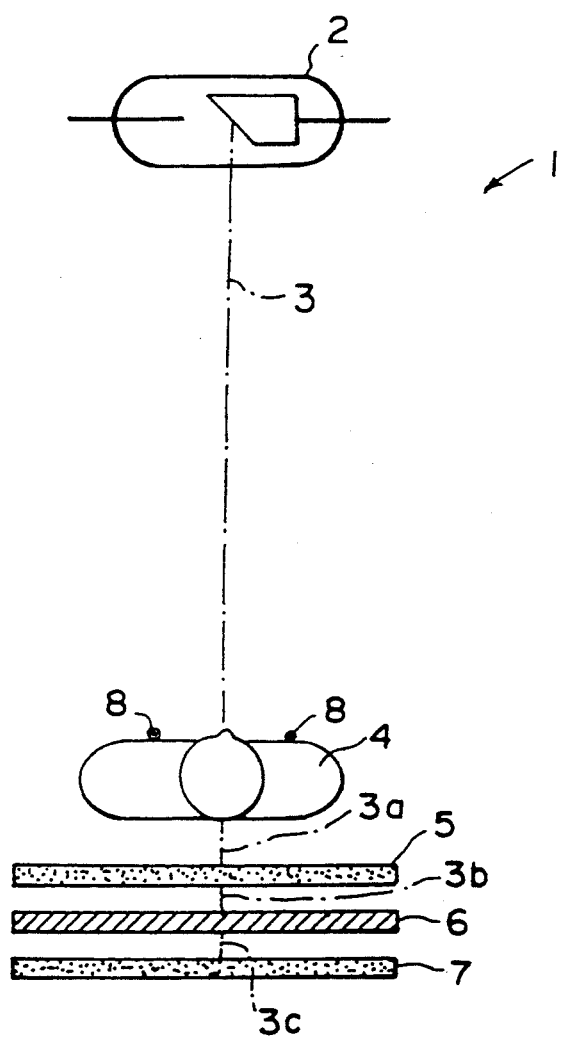
FIG. 1 is a schematic view showing an X-ray image recording apparatus.

FIG. 1 is a schematic view showing an X-ray image recording apparatus 1.

With reference to FIG. 1, X-rays 3 are produced by an X-ray tube 2 of the X-ray image recording apparatus 1 and irradiated to an object 4 (in this example, the chest of a human body). X-rays 3a, which have passed through the object 4, impinge upon a first stimulable phosphor sheet 5, and the comparatively low energy components of the X-rays 3a are stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7. During the image recording operation, marks 8, 8 are placed on the object 4. The images of the marks 8, 8 are utilized in the course of adjusting the positions of the two X-ray images so that the two X-ray images coincide with each other.

In the X-ray image recording apparatus 1, the X-ray images are stored on the first stimulable phosphor sheet 5 and the second stimulable phosphor sheet 7 with a single recording operation. Alternatively, the two X-ray images may be recorded one after the other with two independent recording operations.

Figure 2:
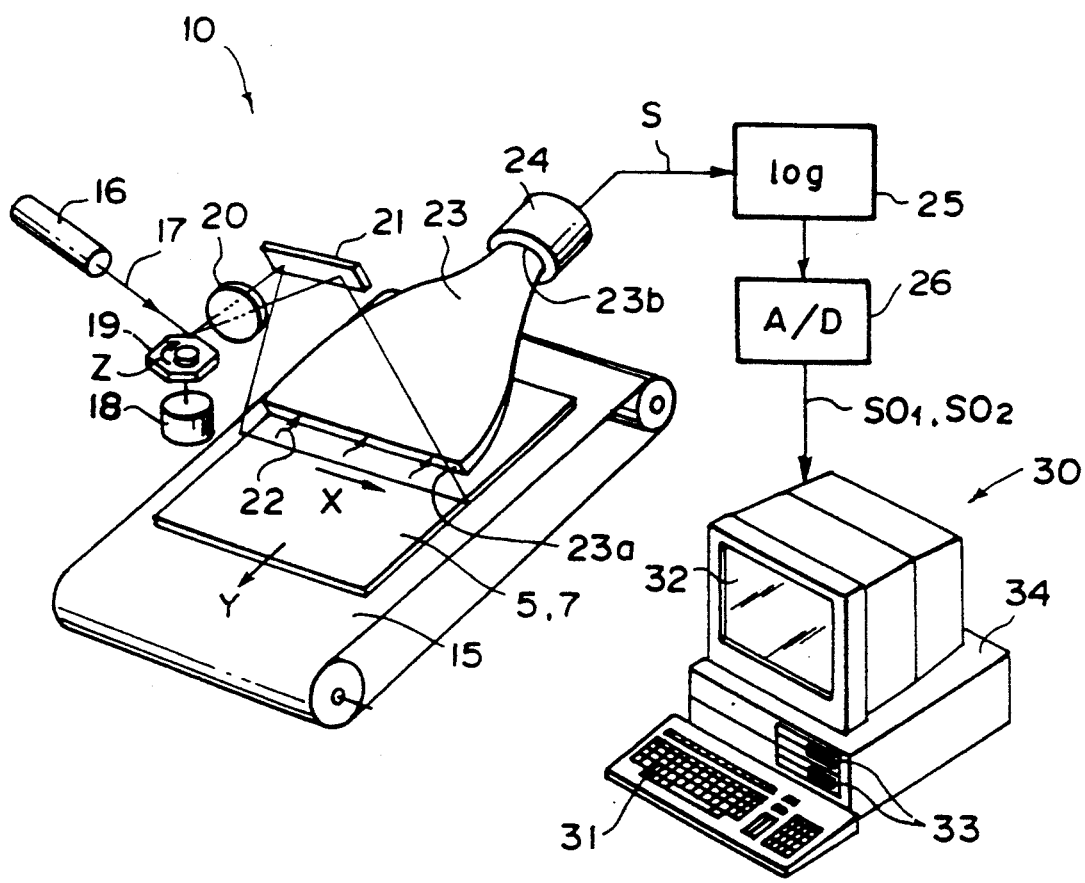
FIG. 2 is a perspective view showing an X-ray image read-out apparatus and an image processing and displaying apparatus, in which an embodiment of the apparatus for forming an energy subtraction image in accordance with the present invention is employed.

FIG. 2 is a perspective view showing an X-ray image read-out apparatus 10 and an image processing and displaying apparatus 30, in which an embodiment of the apparatus for forming an energy subtraction image in accordance with the present invention is employed.

After the first X-ray image and the second X-ray image have been stored respectively on the first stimulable phosphor sheet 5 and the second stimulable phosphor sheet 7 in the X-ray image recording apparatus 1 shown in FIG. 1, the first stimulable phosphor sheet 5 and the second stimulable phosphor sheet 7 are placed one after the other at a predetermined position in the X-ray image read-out apparatus 10 shown in FIG. 2.

How the first X-ray image is read out from the first stimulable phosphor sheet 5 will be described hereinbelow.

With reference to FIG. 2, the first stimulable phosphor sheet 5 is conveyed in a sub-scanning direction indicated by the arrow Y by a sheet conveyance means 15, which is constituted of an endless belt or the like and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which is constituted of an $f\theta$ lens or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with an embodiment of the apparatus for forming an energy subtraction image in accordance with the present invention. The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7. The second image signal SO2 is stored in the internal memory of the image processing and displaying apparatus 30.

FIG. 3 is a flow chart showing the processes, which are carried out in the image processing and displaying apparatus 30. The processes are carried out on the first image signal SO1 representing the first X-ray image and the second image signal SO2 representing the second X-ray image, which signals are stored in the internal memory of the image processing and displaying apparatus 30.

The first image signal SO1 and the second image signal SO2, which are stored in the internal memory of the image processing and displaying apparatus 30, represent a first X-ray image 41 and a second X-ray image 42 shown in FIG. 3. The first X-ray image 41 has been recorded with the comparatively low energy components of the X-rays. The second X-ray image 42 has been recorded with the comparatively high energy components of the X-rays. Both of the first X-ray image 41 and the second X-ray image 42 are original images composed of patterns of soft tissues and bones. The levels of image density of the soft tissue patterns and the bone patterns are different between the first X-ray image 41 and the second X-ray image 42.

The first image signal SO1 and the second image signal SO2 are read from the internal memory of the image processing and displaying apparatus 30 shown in FIG. 2. Position adjustment processing is then carried out on the first image signal SO1 and the second image signal SO2 such that the positions of the first X-ray image 41 represented by the first image signal SO1 and the second X-ray image 42 represented by the second image signal SO2 may coincide with each other. For this purpose, a method disclosed in, for example, U.S. Pat. No. 4,710,875 may be employed. With the position adjustment processing, one of the two X-ray images is linearly moved or rotated with respect to the other X-ray image until the images of the marks 8, 8 in one X-ray image, which marks are shown in FIG. 1, overlap the images of the marks 8, 8 in the other X-ray image.

Thereafter, a smoothed image, in which the low frequency components of an X-ray image have been emphasized, is formed.

The smoothed image may be obtained from the first X-ray image 41 or the second X-ray image 42. Alternatively, in this embodiment, in order for noise components included in the first X-ray image 41 and the second X-ray image 42 to be reduced, the smoothed image is formed in the manner described below. Specifically, the image signal components of the first image signal SO1 and the second image signal SO2 are added to each other which represent the image information stored at corresponding picture elements in the two X-ray images. Thus a superposition image signal SO is obtained, which can be expressed as $$SO = SO1 + SO2 \tag{1}$$

The superposition image signal SO represents a superposition image, which results from the superposition of the first X-ray image 41 and the second X-ray image 42 upon each other. The superposition image is then smoothed, and a smoothed image is thereby obtained. In this embodiment, the mean value of the values of the image signal components of the superposition image signal SO is calculated, which image signal components represent a plurality of picture elements located around each picture element in the superposition image. The calculation is carried out for every picture element in the superposition image, and a smoothed image signal SSM is generated, which is constituted of the mean values thus calculated and represents the smoothed image.

After the smoothed image signal SSM has been obtained, a subtraction process is carried out on the first image signal SO1 and the second image signal SO2. Specifically, the first image signal SO1 and the second image signal SO2 are weighted, and the image signal components of the weighted image signals are subtracted from each other which represent the image information stored at corresponding picture elements in the two X-ray images. Thus a soft tissue image signal S1 is obtained, which can be expressed as $$S1 = Ka \cdot SO2 - Kb \cdot SO1 + Kc \qquad (2)$$

The soft tissue image signal S1 represents a soft tissue image 43 shown in FIG. 3, in which image the patterns of the bones of the object 4 have been erased and only the patterns of the soft tissues are illustrated. In Formula (2), Ka and Kb denote the parameters, which determine the weights of the first image signal SO1 and the second image signal SO2, and Kc is a parameter, which determines the bias component. In this embodiment, each of the parameters Ka, Kb, and Kc is represented by a function of the smoothed image signal SSM.

Figure 4A:
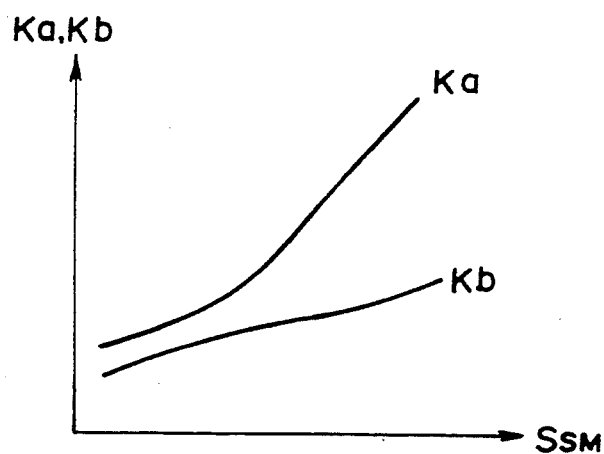
FIGS. 4A and 4B are graphs showing examples of functions representing the parameters used in a subtraction process.
Figure 4B:
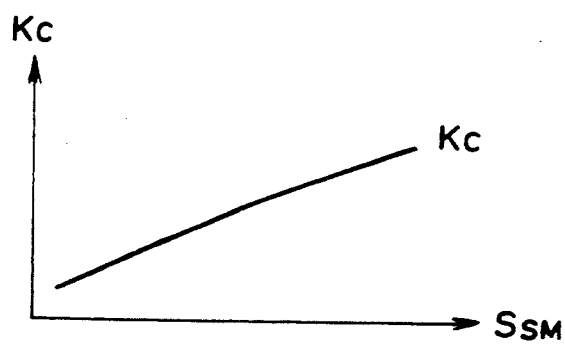

FIGS. 4A and 4B are graphs showing examples of the functions representing the parameters Ka, Kb, and Kc.

As shown in FIG. 4A, each of the parameters Ka and Kb is represented by a function, the value of which increases monotonously as the value of the smoothed image signal SSM increases. Also, the values of the parameter Ka are always larger than the values of the parameter Kb. As illustrated in FIG. 4B, the parameter Kc is also represented by a function, the value of which increases monotonously as the value of the smoothed image signal SSM increases.

Information about the functions, which represent the parameters Ka, Kb, and Kc and in which the level of the smoothed image signal SSM serves as a variable, is stored in the memory (i.e. the parameter storage means of the apparatus for forming an energy subtraction image in accordance with the present invention), which is located in the image processing and displaying apparatus 30. The information about the functions is read from the memory in the course of carrying out the subtraction process with Formula (2).

The soft tissue image signal S1, which has been generated with Formula (2), is fed into the CRT display device 32 of the image processing and displaying apparatus 30. A visible image is then reproduced from the soft tissue image signal S1 and displayed on the CRT display device 32.

In the embodiment described above, all of the parameters Ka, Kb, and Kc in Formula (2) are represented by the functions wherein the level of the smoothed image signal SSM serves as a variable. However, all of the parameters Ka, Kb, and Kc need not necessarily be represented by functions. For example, the parameter Kc may be a fixed number.

Also, in the embodiment described above, the parameters Ka, Kb, and Kc are represented by the functions wherein the level of the smoothed image signal SSM, which represents the smoothed image obtained by smoothing the superposition image, serves as a variable. However, the parameters Ka, Kb, and Kc need not necessarily be represented by the functions wherein the level of the smoothed image signal SSM serves as a variable. For example, the parameters may be represented by functions of the level of the superposition image signal SO, which is obtained with Formula (1) and represents the superposition image, depending on the level of noise included in the first X-ray image 41 and the second X-ray image 42, the level of image quality which the soft tissue image 43 is required to have, or the like. Alternatively, the parameters may be represented by functions of the level of the first image signal SO1 representing the first X-ray image 41 or the level of the second image signal SO2 representing the second X-ray image 42.

In the aforesaid embodiment, the soft tissue image signal S1 is generated. In cases where a bone image 44 shown in FIG. 3 is to be used, a bone image signal S2 may be generated by using functions, which represent parameters for a bone image.

The method and apparatus for forming an energy subtraction image in accordance with the present invention are not limited to processing of X-ray images of the chest of a human body, but is applicable widely when images are to be obtained, in which the patterns of specific tissues of a single object have been emphasized or only such patterns are illustrated. For example, the method and apparatus for forming an energy subtraction image in accordance with the present invention are also applicable when an image, in which the patterns of mammary glands have been emphasized, or an image, in which the pattern of a malignant tumor has been emphasized, is to be obtained from X-ray images of a mamma of a human body.

Also, in the aforesaid embodiment of the apparatus for forming an energy subtraction image in accordance with the present invention, stimulable phosphor sheets are used. However, the method and apparatus for forming an energy subtraction image in accordance with the present invention are also applicable when other recording media, such as X-ray film (ordinarily combined with intensifying screens), are used.

I claim:

1. A method for forming an energy subtraction image, which comprises the steps of:
   i) after a plurality of radiation images of an object are recorded on recording media by radiation with different energy distributions having passed said object, which is constituted of a plurality of tissues exhibiting different levels of radiation absorptivity and a plurality of image signals representing the plurality of said radiation images are then detected, each of the plurality of said image signals being made up of a series of image signal components, selecting an image signal from the plurality of said image signals, or generating an image signal, which represents the mean-level image of the plurality of said radiation images, from the plurality of said image signals,
   ii) changing the values of parameters, which are used for a subtraction process, in accordance with the values of said image signal, which has been selected from the plurality of said image signals, or in accordance with the values of said image signal, which represents the mean-level image of the plurality of said radiation images, and iii) subtracting the image signal components of the plurality of said image signals from each other, which image signal components represent corresponding picture elements in the plurality of said radiation images, with the value of each parameter being thus changed for different picture elements in each of the plurality of said radiation images, whereby a subtraction image signal is obtained which represents a subtraction image, in which only the pattern of a specific tissue of said object is formed or emphasized.

2. A method as defined in claim 1 wherein said image signal, which represents the mean-level image of the plurality of said radiation images, represents an image, in which only the low frequency components of the radiation images have been illustrated or emphasized.

3. A method as defined in claim 2 wherein a superposition image signal, which is obtained by carrying out an addition process on the plurality of said image signals representing the plurality of said radiation images, is smoothed, and a smoothed image signal thus obtained is employed as said image signal, which represents the mean-level image of the plurality of said radiation images.

4. A method as defined in claim 1 wherein said recording media are stimulable phosphor sheets.

5. A method as defined in claim 4 wherein each of the plurality of said image signals representing the plurality of said radiation images is obtained by exposing each said stimulable phosphor sheet to stimulating rays, which cause said stimulable phosphor sheet to emit light in proportion to the amount of energy stored thereon during its exposure to the radiation, and photoelectrically detecting the emitted light.

6. A method as defined in claim 5 wherein said stimulating rays are a laser beam.

7. A method as defined in claim 1 wherein said recording media are photographic film.

8. An apparatus for forming an energy subtraction image, which comprises:

i) a parameter storage means for storing information about functions representing the values of parameters to be used for a subtraction process, in which functions the level of an image signal selected from a plurality of image signals representing a plurality of radiation images of an object or the level of an image signal, which is generated from the plurality of said image signals and represents the mean-level image of the plurality of said radiation images, serves as a variable, the plurality of said radiation images of said object having been recorded on recording media by radiation with different energy distributions having passed through said object, which is constituted of a plurality of tissues exhibiting different levels of radiation absorptivity each of the plurality of said image signals being made up of a series of image signal components, and ii) a subtracting operation means for subtracting the image signal components of the plurality of said image signals from each other, which image signal components represent corresponding picture elements in the plurality of said radiation images, with the values of said parameters, which ave been calculated for the respective picture elements from said functions stored in said parameters storage means, and thereby obtaining a subtraction image signal representing a subtraction image, in which only the pattern of a specific tissue is formed or emphasized.

9. An apparatus as defined in claim 8, further comprising means for obtaining said image signal, wherein said image signal, which represents the mean-level image of the plurality of said radiation images, represents an image, in which only the low frequency components of the radiation images have been illustrated or emphasized.

10. An apparatus as defined in claim 9 wherein said means for obtaining comprises means for obtaining a superposition image signal by carrying out an addition process on the plurality of said image signal representing the plurality of said radiation images, and providing a smoothed image signal thus obtained which is employed as said image signal, and which represents the mean-level image of the plurality of said radiation images.

11. An apparatus as defined in claim 8 wherein said recording media are stimulable phosphor sheets.

12. An apparatus as defined in claim 11 further comprising means for exposing each stimulable phosphor sheet to stimulating rays, which cause said stimulable phosphor sheet to emit light in proportion to the amount of energy stored thereon during its exposure to the radiation, and further comprising means for photoelectrically detecting the emitted light.

13. An apparatus as defined in claim 12 wherein said stimulating rays are a laser beam.

14. An apparatus as defined in claim 8 wherein said recording media are photographic film.

* * * * *